UNITED STATES PATENT OFFICE.

JULIUS AUGUSTUS ROTH, OF PHILADELPHIA, PENNSYLVANIA, ASSIGNOR TO JAMES B. BROWN, OF PEEKSKILL, NEW YORK.

IMPROVEMENT IN THE MANUFACTURE OF PAPER-PULP.

Specification forming part of Letters Patent No. 49,480, dated August 15, 1865; Reissue No. 2,100, dated November 7, 1865.

*To all whom it may concern:*

Be it known that I, JULIUS AUGUSTUS ROTH, of Philadelphia, in the State of Pennsylvania, have invented a new and useful improvement in the process of treating fibrous vegetable substances, such as wood, hemp, flax, tow, manila, grass, and all other vegetable substances containing fiber suitable for making pulp for the manufacture of paper; and I do hereby declare that the following is a full, clear, and exact description thereof.

The said invention relates to a process for treating vegetable substances—such as wood, hemp, manila, grass, and other vegetable substances which contain fiber—so as to separate the proximates from and thereby render the fibers suitable for making pulp such as is used in the manufacture of paper, particularly for white paper.

Various vegetable substances have heretofore been subjected to the action of solutions of caustic alkali for a considerable time at very high temperatures and under heavy pressures, with a view to detach the proximates or components of such vegetable substances from the fibers, so as to render the fibers suitable for making pulp for the manufacture of paper. Such process is objectionable for various reasons, such as the great danger due to the pressures developed by exposing a liquid for a considerable time in a close vessel to very high temperatures, particularly when economy requires the working of such process in vessels of considerable capacity, and even then the expense is considerable.

I have discovered that when vegetable substances are subjected in close vessels to the chemical action of chlorine in the gaseous form, the proximates—that is, the substances which in the plant are united with and connect the fibers—become so modified and detached that they can be effectually separated from the fibers, and leave them in a suitable condition to be made into pulp suitable for making paper by the process generally practiced in making pulp from rags.

The wood, hemp, or other vegetable substance to be treated by my said process is to be first reduced by mechanical means—such as cutting, pounding, crushing, or grinding—depending upon the judgment of the operator and the physical structure or condition of the material. When wood is the substance to be treated, it may be reduced to shavings; or it may be ground into a suitable shape or crushed by passing between rollers. If the substance be hemp, or flax-tow, or cane, it may be cut into short pieces and crushed by being passed between rollers or otherwise reduced. Any suitable means may be employed for the purpose, as the sole purpose of such mechanical treatment is to facilitate the working of said process, that the chlorine gas may have more ready access, and enable it more readily to reach or impregnate every part of the material equally while under treatment. If the wood or other vegetable substance has not been dried or seasoned, but still retains the moisture found in green wood and other plants which have been recently cut, after being mechanically reduced, as above stated, it will be in a suitable condition for being subjected to the chemical process which constitutes my invention; but as such substances are generally obtained by the manufacturer in a dried state, it will be found expedient to penetrate them with moisture, either by steeping them in cold or hot water, or, what is still better, by steaming them, before they are subjected to the chemical process. The vegetable substance to be treated, after it has been prepared as above stated, is put into a close vessel of any suitable construction, and subjected to the action of chlorine gas until it (the vegetable substance) becomes yellow, when it is taken out and ready for the subsequent treatment as ordinarily done in the paper-mill, after which the material so treated is ready to be worked into any desired quality of paper by the ordinary means as now known and practiced. The chlorine gas is to be produced by any suitable means, as this makes no part of my invention, and means for producing it are well known in the arts. The vessel to be employed must be provided with a suitable means for the admission of the chlorine gas and the material to be treated. The time required for the gas to produce the desired chemical effect to detach the components from the fiber will vary from three to nine hours, depending upon the quantity of vegetable matter charged in the vessel. If in small quantities, the required change will be produced in about three hours, and if the quantity be large and the pieces not well reduced, it may require as much as ten hours. The chemical action of the chlorine gas will be expedited by agitating the mass in the vessel by suitable mechanical arrangements for that purpose, such as were well known before in the art of making paper. After the vegetable substance has been thus treated, the proximates can be readily separated from the fibers in the ordinary manner as heretofore known and used, and the fibers will then be in a state suitable to be worked into pulp for making paper by any of the now known processes.

I do not claim as of my invention the mode above described of reducing by mechanical means and then moistening vegetable substances which are to be treated chemically for obtaining fibers in a suitable condition for making pulp, as such modes of preparation are well known and have been frequently used prior to my said invention; nor do I claim subjecting such vegetable substances to the process of washing after a chemical process has been employed to decompose the proximates, as such mode of treatment has prior to my said invention been employed in connection or combination with other methods of effecting the chemical decomposition; but What I do claim as my invention in the process of treating vegetable substances is—

The process, substantially as herein described, of subjecting fibrous vegetable substances to the action of chlorine gas, and for the purpose specified.

JULIUS A. ROTH.

Witnesses:
WM. H. BISHOP,
ANDREW DE LACY.